United States Patent

Shano

[15] 3,651,341
[45] Mar. 21, 1972

[54] CAPACITOR DISCHARGE PULSE SOURCE

[72] Inventor: Charles L. Shano, 321 E. Wagon Wheel Drive, Phoenix, Ariz. 85020

[22] Filed: May 28, 1970

[21] Appl. No.: 41,371

[52] U.S. Cl............................307/246, 123/148 E, 307/268, 315/209 CD, 315/209 T
[51] Int. Cl......................................................H03k 17/00
[58] Field of Search...................307/246, 260, 268; 328/67; 315/206, 209 T, 209 CD; 123/148 E

[56] References Cited

UNITED STATES PATENTS 3,520,288    7/1970    Dusenberry et al..............123/148 E

*Primary Examiner*—John Zazworsky
*Attorney*—Andrus, Sceales, Starke & Sawall

[57] ABSTRACT

A pair of main charging transistors are connected in a Darlington circuit in series with the primary of a step-up transformer having a saturable nonlinear core to a battery. The secondary of the transformer is connected in series with diodes to charge a capacitor. A holding transistor connects the base of one charging transistor to the battery. A pair of resistors are connected in series with each other and in series with the main charging transistors. The junction of the resistors is connected to the base of the holding transistor. A bypass transistor in parallel with the one resistor permits turnoff of the holding transistor. A current-sensing resistor is connected across the input elements of the bypass transistor and in series with the primary winding and the main charging transistors. A controlled rectifier or other rapid-acting and gated switch means connects the capacitor to the spark plugs of an internal combustion engine. The gate is connected to the output circuit of the holding transistor by means of a simple capacitor couple and fires to discharge the capacitor upon turn-on of the holding transistor.

12 Claims, 3 Drawing Figures

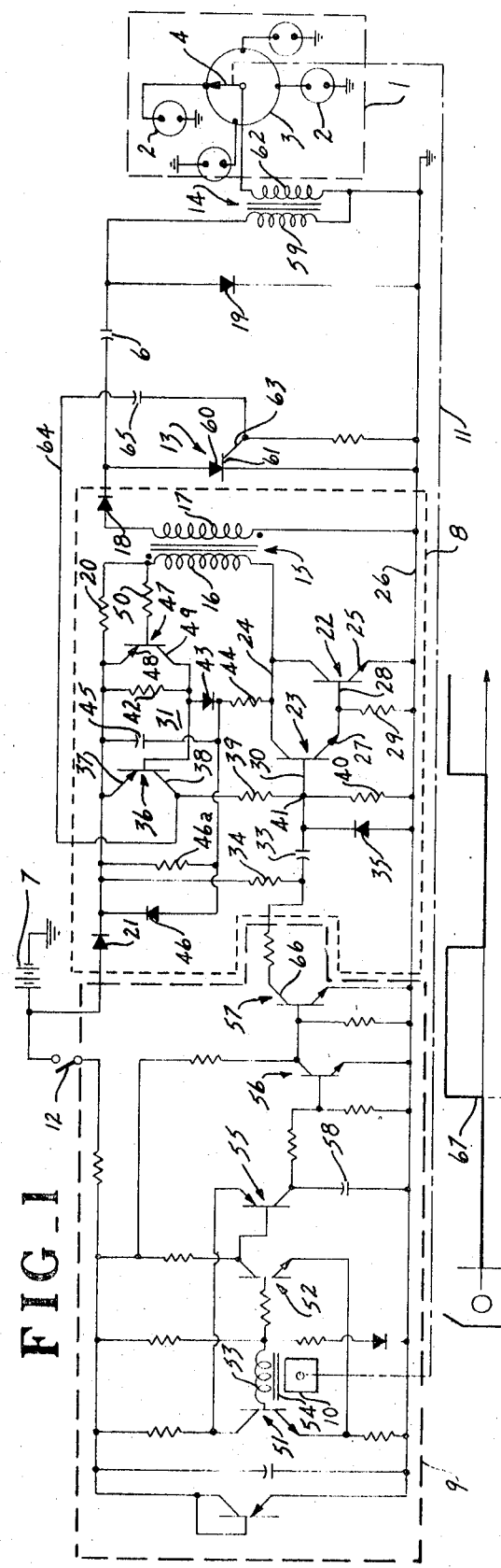

CAPACITOR DISCHARGE PULSE SOURCE

BACKGROUND OF INVENTION

This invention relates to a capacitor discharge power supply and particularly to a direct current converter for increasing the direct current voltage and creating a high voltage pulse for corresponding energizing of a load such as ignition systems for internal-combustion engines, welding apparatus and the like.

In many applications, a high voltage, short-duration pulse is required. For example, internal-combustion engine ignition systems, gas turbine ignition systems, welding generators, electronic discharge machining or processing apparatus and the like may advantageously employ a train of time-spaced, high voltage, short-duration energy pulses. This energy may be derived from a relatively low voltage, direct current source by charging of a capacitor to a higher voltage and then rapidly discharging of a capacitor to a higher voltage and then rapidly discharging of a capacitor into the load. For example, internal-combustion engine ignition systems have been developed employing such a capacitor discharge concept. The capacitor is connected to the battery or other suitable voltage source through a suitable DC to DC converter. The capacitor is connected in a discharge circuit through an electronic switch such as a thyristor or controlled rectifier and a pulse transformer, the output of which is connected through the distributor to the spark plugs. At an appropriate time, a gating device provides a signal to a gate of an electronic switch, causing it to fire and discharge the capacitor through the transformer and thus into the sparkplug. By appropriate design, a fast-rise, short-duration pulse energy is impressed upon the spark plug resulting in a highly advantageous ignition. The converter may advantageously be constructed with a suitable storage inductor which is interconnected to the power supply through an electronic switching means. The inductor takes energy from the battery and stores it during a given switching period and then transfers it through a suitable blocking diode to the capacitor to permit charging of the capacitor to a higher voltage than that of the battery. Various systems have been suggested employing blocking oscillators and similar other switching circuits, for example, as shown in U.S. Pat. No 3,372,582 to B. L. Phillips et al.

SUMMARY OF PRESENT INVENTION

The present invention is particularly directed to a reliable and relatively inexpensive converter which is particularly adapted to rapid-rise, short-duration voltage pulse signal generation and more particularly adapted to ignition systems and the like where they are required to operate in a reliable and repeatable manner over a relatively wide range of voltage inputs, temperatures and variations in output repetition rate.

Generally, in accordance with the present invention, a main or charging electronic switch is connected in series with a step-up transformer having a saturable core but not of a square loop characteristic to a low voltage direct current supply, such as a battery. The secondary of the transformer is connected to a capacitor via a unidirectional conducting means. A control or holding electronic switch connects the input circuit of the main electronic switch to the battery. The holding switch has its input circuit, in turn, connected to respond to the current supplied to the transformer and the main electronic switch, and thus in parallel with a current-sensing device, such as the transformer and/or a separate sensing impedance and in series with the charging switch. In a particularly novel construction, the charging switch employs a Darlington transistor circuit in series with the primary winding of the step-up transformer and a current-sensing resistor. The resistor is connected across the input elements of the holding switch. Once the charging switch is biased to conduct, it establishes a simultaneous current path through the sensing resistor and the transformer. This provides a turn-on signal to the holding switch which is also a transistor and drives the holding switch on which, in turn, further drives the charging switch on. The current will thus increase until such time as the charging transistors are saturated. As a result of voltage saturation, the voltage across the switch will begin to increase. This, in turn, reduces the drive to the base of the circuit of the holding switch and through an opposite operation, results in an abrupt turnoff of the holding transistor and, consequently, the charging transistors. Further, the saturating core characteristic of the transformer will assist a rapid turnoff. This opens the circuit to the saturable transformer and the polarity of the transformer windings reverse and the energy is transferred through the unidirectional conducting means to the capacitor. A controlled rectifier or other rapid acting and gated switch means connects the capacitor to the load, such as the spark plugs of an internal-combustion engine. The gate is advantageously connected to the output circuit of the holding transistor by means of a simple capacitor couple.

The input to the charging transistors may be from any suitable pulse source. For example, for an ignition system, a pulse source operated in timed relation to the rotation of the distributor will provide a series of turn-on pulses to initiate cycles of the charging transistor. Alternatively, a constant repetition pulse drive can be provided. Furthermore, with a repetitive turn-on signal source, the voltage to which the capacitor is charged may be regulated through a sensing network connected to sense the charge on the capacitor and at a selected voltage, actuate a voltage sensitive switch to trigger the controlled rectifier to discharge the capacitor after which the capacitor will again charge to the selected level.

The present invention has been found to provide a relatively simple and inexpensive capacitor discharge pulsing system which has been particularly adapted to capacitor discharge ignition systems for internal-combustion engines and the like.

BRIEF DESCRIPTION OF DRAWING

The drawing furnished herewith illustrates the best modes presently contemplated by the inventor for carrying out the subject invention and clearly disclosing the above advantages and features as well as others which will be readily understood from the following description.

In the drawing:

FIG. 1 is a schematic circuit diagram of a capacitor discharge ignition system for an internal-combustion engine constructed in accordance with the present invention;

FIG. 2 is a diagrammatic illustration of the voltages generated in the circuit to clearly illustrate the operation of the circuit of FIG. 1; and FIG. 3 is a schematic circuit diagram of the invention employing a constant repetition rate drive and a stored energy level discharge control.

DESCRIPTION OF ILLUSTRATED EMBODIMENTS

Referring to the drawing and particularly to FIG. 1, the invention is shown applied to a capacitor discharge ignition system for operating an internal-combustion engine 1 which is diagrammatically illustrated, including a plurality of spark plugs 2 for firing of the appropriate cylinders, not shown. The usual distributor 3 includes the several contacts connected to the spark plugs 2 and a rotating contact 4 for sequentially interconnecting the spark plugs 2 to the output of a capacitor discharge ignition system or power supply. Generally, the illustrated capacitor power supply includes a storage capacitor 6 interconnected to a battery 7 through a charging circuit 8 which particularly forms the subject matter of the present invention. A trigger circuit 9 is interconnected to control the operation or initiation of the charging circuit 8 and includes a rotating impedance control element 10 for periodically actuating the trigger circuit 9 to generate a trigger pulse. The element 10 is coupled to the distributor 3 as diagrammatically shown by the dashed coupling line 11 to provide the desired timed interaction as subsequently described. The trigger circuit 9 is separately connected to the battery 7 through an ignition switch 12 while the charging circuit 8 is directly connected to the battery 7. The capacitor 6 is periodically discharged to the distributor 3 through a control switch shown as a silicon controlled rectifier 13 and a pulse transformer 14 which are connected in series across the capacitor 6.

The trigger circuit 9 periodically actuates the charging circuit 8 to charge the capacitor 6 to a given level. During the initial turn-on of the charging circuit 8, a pulse is simultaneously applied to the rectifier 13 to discharge the previous charge on capacitor 6 through the pulse transformer 14 and thereby through the distributor 3 and appropriate spark plug 2 for firing of the engine 1.

More particularly, the charging circuit 8 includes an energy storage and step-up transformer 15 having a saturable core with a nonlinear impedance characteristic. Thus, the core of transformer 15 may be the usual iron laminations and have an air gap. The transformer 15 includes a primary winding 16 connected to he battery 7, as hereinafter described, and a secondary or transfer winding 17 connected to one side of the capacitor 6 in series with a diode 18 and to the opposite side of capacitor 6 in series with a diode 19. The diode 19 is also connected in parallel with the pulse transformer 14. The diode 18 prevents the discharge of the capacitor through the transformer 15 while the diode 19 bypasses the pulse transformer 14 during the charging cycle thus reducing series charging impedance of capacitor 6 during the charging cycle. Diode 19 acts as a freewheeling diode in conjunction with pulse transformer 14 during the discharge cycle of capacitor 6. When the upper end of the winding 17 is positive, power is supplied from the winding 17 to charge capacitor 6. The capacitor 6 is held charged as a result of the connection of the diodes.

The polarity of the winding 17 is, or course, determined by the voltage across the primary winding 16. During the period that the winding 16 is energized from the battery 7, the windings 16 and 17 are relatively wound to establish a negative potential with respect to ground at the upper end of the winding 17 in the illustrated embodiment of the invention, as shown by the usual polarity dots. Consequently, the diodes 18 and 19 block transfer of current flow from the winding 17 to the capacitor 6. This provides for storage of energy within the core of the transformer 15 for subsequent transfer to the capacitor 6 as follows.

The primary winding 16 is connected to one side of the battery 7 in series with a current-sensing resistor 20 and reverse polarity protection diode 21. The opposite side of the transformer 16 is connected to the common or negative side of the battery 7 in series with a pair of transistors 22 and 23, shown as NPN transistors, interconnected as a Darlington pair and forming the high-gain, rapidly-acting solid state transistor switch. In particular, the collectors of the transistors 22 and 23 are connected to a common line 24 connected to one side of the primary 16. The emitter 25 of the transistor 22 is connected to the common or reference line 26 which is connected to the negative or ground side of the battery 7. The emitter 27 of the transistor 23 is connected to the base 28 of transistor 22 and to the ground line 26 through a relatively large resistor 29. The base 30 of the transistor 23 constitutes the input terminal of Darlington pair in common with the line 26. The base 30 is connected to the trigger circuit 9 and also to a holding circuit 31 which establishes an alternate input circuit to the Darlington pair from the battery 7 and which is responsive to the charging current as subsequently described.

In the illustrated embodiment of the invention, a differentiating capacitor 33 in series with the resistor 34 connects the positive side of the battery to the base 30 of the transistor 23. A clamping diode 35 is shown connected across the base-to-emitter circuit of the transistor 23 to limit the back voltage applied across the emitter-to-base circuit of the transistor. The capacitor is normally held close to ground potential by the trigger circuit 9. When an appropriate pulse or actuation of the trigger circuit is established, the capacitor is connected to the battery 7 through the resistor 34 and provides a differentiated positive pulse to the base of the transistor 23. This, in turn, initiates the conduction of the Darlington pair through the simultaneous turn-on of transistors 22 and 23 through the base-to-emitter circuit of transistor 22 in series with the base-to-emitter circuit of transistor 23. This, in turn, results in conduction from the battery through the diode 21, sensing resistor 20, and the primary winding 16. As a result of the initial turn-on, a negative potential appears at the collector connection 24 which, in turn, results in actuation of the holding circuit 31 to maintain and, in fact, increase the conduction of the Darlington pair as follows.

The holding circuit includes a transistor 36 shown as a PNP transistor connected in the alternate input or bias circuit to the transistor 23. Thus, the emitter 37 of the transistor 36 is connected directly to the positive supply line and to the battery 7 through the diode 21. The collector 38 is connected in series with a pair of series-connected, voltage-dividing resistors 39 and 40 to the reference or negative line 26. The junction 41 of the resistors 39 and 40 is connected to the base of transistor 23. Thus, when the transistor 35 conducts, it provides current through the voltage-dividing network and thus to the base-to-emitter circuit of the transistor 23 to provide a drive-on signal thereto in accordance with conductivity level of the transistor 36.

The conductivity of the transistor 36 is controlled by the connection of its input circuit in series with the Darlington pair to the battery 7 such that its conduction, in turn, is dependent upon the conducting characteristic of the transistors 22 and 23 as follows.

A voltage-dividing network is connected between the positive battery supply and the Darlington pair and includes a resistor 42 connected to the positive line, a diode 43 and a resistor 44 connected in series. The base of the transistor 36 is connected to the junction of the diode 43 and the resistor 42 such that the voltage across the resistor 42 is impressed across the emitter-to-base circuit of the PNP transistor 36 and provides a corresponding drive. A capacitor 45, a diode 46 and a resistor 46a are connected across the resistor 42 and the diode 43 to effect high temperature operating stability and to prevent circuit oscillation. These elements also compensate for leakage reactance in transformer 15 by absorbing overshoot transients produced when capacitor 6 has received its charge and the voltage at line 24 returns to its quiescent level.

When the transistors 22 and 23 of the Darlington pair conduct, they establish a current path through the voltage-dividing network of the resistor 42 and, in turn, develop an emitter-to-base drive across the transistor 36 thereby causing it to conduct. Its conduction, in turn, provides current through the voltage-dividing resistors 39 and 40 and thus through the junction 41 and the base-to-emitter circuit of the Darlington pair transistors 22 and 23 to further drive such transistors into conduction and thus provide regenerative switching action. This simultaneously maintains current through the primary winding 16 of the storage transformer 15.

In the illustrated embodiment of the invention, the transistor 36 is cut off at a particular current level as a result of a sensing resistor 20 which controls the input voltage applied to a turnoff or cutoff transistor 47, shown as a PNP type transistor. The transistor 47 has its emitter 48 connected to the positive voltage side of the resistor 20 and its collector 49 connected to the base of the transistor 36 and thus across the voltage-dividing resistor 42. When the transistor 47 is driven on, the emitter-to-collector impedance drops below the turn-on bias level of the transistor 36 and, in effect, bypasses that circuit, thereby maintaining current to the Darlington pair but bypassing the transistor 36. This results in a rapid turnoff of the transistor 36 with a consequent rapid turnoff of the Darlington pair and effectively opening the switching circuit. This reverses the polarity across the primary winding 16 and the related secondary winding 17, causing the upper end of winding 17 to become positive. This, as previously noted, provides a charging path to the capacitor 6 and the energy stored in the transformer 15 will thus be dissipated as a current in the secondary winding 17 charging the capacitor 6 to an increased voltage level.

The base of the transistor 47 is connected, in the illustrated embodiment of the invention, in series with a temperature compensation resistor 50 to the junction of the current-sensing resistor 20 and the one side of the primary winding 16 such that the voltage drop appearing across the sensing resistor 20 appears across the emitter-to-base circuit of the transistor 47. The voltage drop across the resistor 20 is directly proportional to the current and thus proportional to the energy stored in the transformer 15. Thus, at a given level of energy storage, the transistor 47 is driven to conduction and thereby rapidly drives the charging circuit off. The initiation and completion of the energy charging cycle is therefore responsive to the initial turn-on of the charging circuit. The illustrated resistor 50 is selected to have a positive temperature coefficient to compensate for the negative voltage coefficient with temperature of the base-to-emitter junction of transistor 47. The particular resistor 50 selected further establishes and thereby permits adjustments of the energy storage level to a predetermined and precise value. The voltage drop across the limiting resistor 20 is controlled by the base-to-emitter drop of the transistor in series with the voltage drop across the temperature compensating resistor. The resistance of resistor 50 therefore further determines the turnoff point of the charging cycle and the energy storage level over a given operating temperature range.

In the illustrated embodiment of the invention of FIG. 1, a timed turn-on is established by the special trigger circuit 9 which, with the charging circuit 8, provides an unusually satisfactory and practical ignition system. The trigger circuit as such is particularly the subject matter of applicant's copending application entitled "Electrical Pulse Source," which was filed on the same day as the present application. Generally, the trigger circuit includes a difference amplifier including a pair of similar transistors 51 and 52 connected in parallel with their base circuits connected to a bias network. The transistor 51 includes a trigger coil 53 connected in its base circuit and wound on a suitable magnet core 54. The rotating magnetic element 10 moves adjacent the core 54 and varies the flux permeability of the total flux path thereby generating a signal in the trigger coil 53. This, in turn, generates a control pulse varying the conductivity of the transistor 51 resulting in a difference across the collector circuits of the transistors 51 and 52.

An amplifying transistor 55 is connected across the collector junctions and interconnected to a pair of cascaded transistors 56 and 57. A capacitor 58 filters out spurious fast signals created by threshold signal levels of the trigger coil output and prevents the generation of multiple output signals at the collector of transistor 57 and thereby controls the turn-on of the transistor 57. The collector of the transistor 57 is connected in series with a small resistor 58a between the junction of the differentiating resistor 34 and capacitor 33 and the emitter is connected to ground. Transistor 56 is normally off. Transistor 57 is connected directly to the battery 7 through switch 12 and is normally on when the switch 12 is closed. Transistor 57, therefore, normally holds the capacitor 33 at near ground potential, preventing spurious conduction of the first stage transistor 23 of the Darlington transistors in the charging circuit due to battery voltage transients of the like. As the element 10 rotates, the transistor 52 is caused to conduct more heavily and transistor 51 to conduct less, in synchronism with the alignment of the distributor rotating contact 4 and a fixed contact. This causes the transistors 55 and 56 to conduct, thereby cutting off the conduction of transistor 57. When the transistor 57 is cut off, the ground of the differentiating capacitor 33 is released and a pulse input is supplied to the charging circuit through the resistor 34 and capacitor 33. This provides a turn-on pulse to the charging circuit initiating a charging cycle which is completed, as previously described.

As previously noted, the turn-on of the charging circuits simultaneously provides a pulse to the controlled rectifier 13 to discharge the previous energy sorted in the capacitor 6 through capacitor 65.

In the illustrated embodiment of the invention, the primary 59 of the pulse transformer 14 is connected in series with the rectifier 13 to capacitor 6, as follows.

The anode 60 of the controlled rectifier 13 is connected to the positive side of the charged capacitor 6. The cathode 61 is connected to the ground line 26 which is connected to one side of the primary winding 59. When the controlled rectifier 13 is fired, the capacitor 6 discharges through the rectifier, the primary winding 59 of the pulse transformer 14 and back to the capacitor 6. The diode 19, which is also connected to line 26, is back-biased in this circuit and, thus, the initial capacitor current all flows through primary winding 59. This results in a large voltage pulse in the secondary 62 of the pulse transformer 14 which is applied through the distributor 3 to the appropriate spark plug 2. Diode 19 acts to absorb the backswing of the voltage applied to the pulse transformer 14 thus confining the resulting current flow to the circuit of pulse transformer 14.

The rectifier 13 is fired in synchronism with the initiation of the charging cycle, as follows.

The gate 63 of the rectifier is connected via line 64 which includes a capacitor 65 to the collector 38 of the holding transistor 36. Upon the initial firing or triggering of the Darlington circuit transistors 22 and 23 and the driving of the holding transistor 36 into conduction, current is simultaneously applied via the pulsing capacitor 65 to the gate 63. This provides a pulse signal to the rectifier's gate-to-cathode circuit, driving the rectifier 13 into conduction and thereby providing a discharge path for the capacitor 6. The capacitor 65 will rapidly charge and thereby terminate the current to the gate 63 to prevent holding of the rectifier into conduction. Consequently, the capacitor 6 will discharge through the pulse transformer 14 and the control rectifier 13 will reestablish its blocking state.

Referring particularly to FIG. 2, the various wave forms resulting from the controlled turn-on and turnoff of transistor 57 is shown. The output of the trigger generating unit 9 appearing at the collector 66 is a square wave voltage signal 67 applied to the input of the charging circuit 8. A differentiated trigger pulse is established in synchronism with the leading edge of the square wave signal 67 to initiate conduction of transistor 22 and 23. The voltage at the collector of the charging transistor 22 and 23 is shown at 58. As illustrated, the transistors 22 and 23 are normally off and therefore will normally be at some positive level. When the transistors 22 and 23 turn on, the voltage drops rapidly to some low potential, generally a potential, generally a potential of the reference line. It will be maintained at this potential during the greater period of conduction and until such time as voltage across resistor 20 drives transistor 47 to conduct and cut off the transistors 36, 22 and 23. As a result of the degenerative interaction as previously described, the voltage will rise rapidly, as shown at line 69. Further, as a result of the saturation of the transformer 15 and the cutoff of the current through it, the voltage reverses within the transformer and, consequently, the voltage appearing at the collector line 24 rises rapidly in the positive direction, as shown at a portion of trace 70. This, of course, positively back-biases the circuit of the holding transistor 36 to positively insure the cutoff state. This voltage is related to a current trace 71. Thus, with the transistors 22 and 23 held off, the current is zero or essentially so except for any slight leakage current, which is insignificant. As soon as the transistors 22 and 23 conduct, the current begins to rise. At the point that the resistor 20 drives transistor 47 to conduct, the current peaks and, due to the degenerative action, essentially drops directly back to the zero level. It is held in this state until the subsequent cycle.

The reversing of the polarity of the transformer windings 16 and 17 provides transfer of energy to the capacitor 6, as previously described.

The capacitor charging voltage trace is shown at 72. Thus, assuming the capacitor 6 has been previously charged, the initiation or the leading edge of the square wave signal 67, which initiates the charging cycle and conduction of holding transistor 36, transmits a pulse signal from the collector 38 of transistor 36 via the gate capacitor 64 to fire the controlled rectifier 13. The capacitor 6 discharges essentially instantaneously, as shown on trace 72, and the voltage on the capacitor 6 drops to zero. The capacitor 6 is maintained at the zero level during the storage or charging cycle corresponding to the period that the transistors 22 and 23 conduct. At the end of that period and during the reversal of the polarity in the transformer 15, as shown by traces 69 and 70, the energy in the transformer 15 is transferred to the capacitor 6 which is raised to previously established charge level. It is held at this level until the subsequent cycle. The voltage applied to the load is thus a series of time-spaced pulses, as shown at 73.

Thus the present invention comprises an improved capacitor discharge ignition system for establishing a series of time-spaced energy pulses. The operation of the switching circuitry to store and transfer energy is essentially independent of ambient temperature or the like, as well as the speed of the operation of the engine 1, within the capabilities of the charging circuit. Further, the circuit will operate over a wide range of input voltages. All of these characteristics particularly adapt the system to a capacitor discharge ignition system for internal combustion engines and the like. However, the invention may be employed in other applications where a repetitious drive is desired at a given time rate and/or at a given voltage level, for example, as shown in FIG. 3.

Referring particularly to FIG. 3, the external trigger drive has been replaced with a self-cycling pulse source 74. Generally, other than for the pulse source 74 and a voltage level control described hereinafter, the charging and discharging circuitry essentially corresponds to that previously described and the corresponding elements thereof are correspondingly numbered for simplicity and clarity of explanation.

In FIG. 3, the sensing resistor and associated cutoff transistor have been removed and the bias resistors for the holding transistor 36 are connected directly in parallel with the primary of the storage and transfer transformer 15. The transformer 15, as in the previous construction, is of saturable core construction such that at a distinct given current level, the core saturates and the impedances drop to a minimal amount. The current through a circuit thus increases, causing the Darlington pair to carry a very high current which is sufficient to cause the transistors 22 and 23 to come out of voltage saturation. As a result, the voltage across the transistors 22 and 23 will begin to increase with reverse or degenerative action, causing a rapid decrease in the conduction of the holding transistor 36 and the drive to the Darlington pair transistors 22 and 23. This results in a rapid turnoff of the charging circuit. This reverses the polarity across the primary winding 16 and the related secondary 17 to transfer the stored energy, as in the first embodiment.

The illustrated pulse source 74 is a basic unijunction transistor pulse generator including a unijunction transistor 75 having its base electrodes 76 connected to the power supply or battery 7 and to the input transistor 23 of the Darlington pair of charging circuit 8. In the illustrated embodiment of the invention, the one base electrode 76 is connected in series with a pair of voltage-dividing resistors 77 and 78 to the positive side of the battery 7 through a suitable main on-off switch 79. With the switch 79 open, power is removed from the unijunction pulse source 74 and, consequently, the circuit will be in a standby condition. The second base electrode 76 is connected directly to the base of the input transistor 23 of the Darlington pair. An emitter resistor 80 of the unijunction transistor 75 is connected in series with a capacitor 81 between the junction of the resistors 77 and 78 and the negative or ground return line to the battery 7. The emitter 82 is connected to the junction of the resistor 80 and the capacitor 81. The voltage across the resistor 80 and capacitor 81 is held at a given selected level by a Zener diode 83 connected directly in parallel therewith. In accordance with well-known circuit operations, when the switch is closed, a current will flow through the resistor 77, emitter resistor 80 and capacitor 81 to ground. The capacitor 81 charges to the breakdown voltage of the emitter junction of the unijunction transistor 75 and then rapidly discharges through the emitter-to-base circuit of the unijunction transistor 75, driving it into conduction and provides a relatively low impedance circuit through the base-to-base circuit. This, in turn, will provide a heavy current pulse to the Darlington pair of charging circuit 8 to initiate conduction therethrough.

As previously noted, the charging circuit illustrated in FIG. 3 essentially corresponds to that previously described and the circuit will operate in essentially the same manner. Thus, the initiation of conduction provides current flow through the primary winding of the transformer 15 with he regenerative action through the holding transistor 15, resulting in the characteristic voltages and currents shown in FIG. 2. At the end of the charging cycle, the energy is transferred to the capacitor 6. The repetition rate of the unijunction pulse source 74 is, of course, less than the cycling time of the charging circuitry in order to insure a complete cycle and transfer of energy to the capacitor 6.

In FIG. 3, an energy level discharge control is provided by a capacitor voltage sensing network 83 which is interconnected to control firing of the controlled rectifier 13. Alternatively, a discharge responsive to the initiation of the charging cycle may be provided in the same manner as shown in FIG. 1, or, alternatively, by interconnecting of the gate lead 63 to any other input point of the charging circuitry, for example, to the base of the transistor 23.

The capacitor voltage sensing network includes a pair of resistors 84 and 85 which are series-connected with each other and preferably with a diode 86 in parallel with the control rectifier 13 and thus between the positive side of the capacitor 6 and ground or reference 26. The resistor 84 is selected to have a relatively high value to essentially minimize conduction through the voltage-sensing circuit so as to not interfere with the charging of the capacitor 6 or to provide a discharge path for the capacitor of any significance. Some leakage can be tolerated since this loss can be made up by increasing the repetition rate of unijunction oscillator circuit 74.

The voltage at the junction 87 of resistors 84 and 85 provides a voltage proportional to the voltage on the capacitor 6 and this is interconnected to control the triggering network for the controlled rectifier 13, as follows.

The triggering network includes a resistor 88 in series with a capacitor 89 and a resistor 90 connected across the battery 7, with the gate 63 of the controlled rectifier 13 connected to the junction of the capacitor 89 and the resistor 90. The resistor 90 is thus connected across the gate-to-cathode circuit of the controlled rectifier. Current through the network will provide a turn-on pulse to the rectifier, the charging of the capacitor 89 establishing the pulse. The capacitor 89 is held at ground potential to prevent triggering until the voltage at junction 87 rises to a selected level, as follows.

A hold-off transistor 91, shown as an NPN transistor, has its collector 92 connected to the junction of the resistor 88 and the capacitor 89. The emitter 93 of the transistor 91 is connected to the ground or negative side of the battery 7. The base 94 is connected in series with a resistor 95 directly to the positive side of the battery 7. Consequently, in the standby condition, current flows from the battery 7 through the resistor 95 and the base-to-emitter circuit of the transistor 91, thereby driving the transistor 91 on. This provides a current path through the emitter-collector circuit bypassing the capacitor 89 and, in essence, holding it at ground or reference potential. A pair of transistors 96 and 97, connected in a Darlington pair to provide high input resistance, are provided with the collector-to-emitter circuits constructed between the base 94 of transistor 91 and reference or ground line 26 to selectively turn off the transistor 91 and thereby permit a pulse current through the capacitor 89 to turn on the rectifier. When the Darlington pair conduct, it effectively grounds to the base, turning off the transistor 91. The base 98 of the Darlington pair is connected to the junction of the capacitor voltage sensing network and, in particular, the junction of the resistors 84 and 85.

In summary, the embodiment of the invention shown in FIG. 3 will operate as follows.

The pulse source 74 will provide a series of time-spaced turn-on pulses to the charging circuit at a rate which is less than the period of the charging circuitry to establish a series of charging cycles and charging of capacitor 6. The voltage is continually sampled by the paralleled voltage-dividing network of the resistors 84 and 85. When the voltage rises to a selected level, the Darlington pair 97 is biased to conduct, turning off the transistor 91. This permits the turn-on signal from the positive side of the battery 7 to flow through the capacitor 89 establishing a pulse to turn on the controlled rectifier 13. The capacitor 6 will then rapidly discharge through the controlled rectifier 13 and the pulse transformer 14 or other output load circuit and reset during the energy storage period of the unit-charging circuit. The charging circuit recycles to recharge the capacitor 6 to the selected level at which time the capacitor 6 is again discharged.

The present invention thus provides a simplified and reliable electronic capacitor discharge or direct current to a direct current convertor employing a capacitor discharge to produce a series of relatively high voltage pulses, and particularly for ignition systems and the like.

Various modes of carrying out the invention are contemplated as being within the scope of the following claims which particularly point out and distinctly claim the subject matter which is regarded as the invention

I claim:

1. A capacitor discharge pulse source for establishing a high voltage pulse from a low voltage direct current source means comprising a capacitor, energy storage transformer means having a primary winding and having an output winding connected to charge said capacitor, a charging amplifier switch means connected in series with said primary winding to direct current source connection means and having an input circuit means controlling conduction through said amplifying switch means, a holding amplifier switch means connected in series with said input circuit means and said direct current source means, means coupled to the input circuit means to initiate conduction, a resistor means in series with said amplifier switch means and connected to the input of said holding amplifier switch means to control the voltage supplied to said holding amplifier switch means with a regenerative increase in the turn-on of said amplifying switch means into saturation and establishing an increase in the voltage across the charging amplifier switch means and a corresponding degenerative decrease in voltage across the resistor means, said storage transformer includes a nonlinear saturable core and said charging amplifier switch means includes a charging transistor connected in series with said primary winding, said holding amplifier switch means including a holding transistor connected in series with said charging transistor, said resistor means including a pair of resistors connected in series with the charging transistor and in parallel with said primary winding, the junction of said resistor being connected to the holding transistor.

2. A capacitor discharge pulse source for establishing a high voltage pulse from a low voltage direct current source means comprising a capacitor, energy storage transformer means having a primary winding and having an output winding connected to charge said capacitor, a charging amplifier switch means connected in series with said primary winding to direct current source connection means an having an input circuit means controlling conduction through said amplifying switch means, a holding amplifier switch means connected in series with said input circuit means and said direct current source means, means coupled to the input circuit means to initiate conduction, a resistor means in series with said amplifier switch means and connected to the input of said holding amplifier switch means to control the voltage supplied to said holding amplifier switch means with a regenerative increase in the turn-on of said amplifying switch means into saturation and establishing an increase in the voltage across the charging amplifier switch means and a corresponding degenerative decrease in voltage across the resistor means said charging amplifier switch means includes a pair of transistors connected in a Darlington circuit with said primary winding, said holding amplifier switch means including a holding-transistor connected in series with said input circuit means of said charging amplifier switch means and said direct current source means, said holding transistor having input elements, and said resistor means including a plurality of resistors connected in series with each other and with said pair of transistors, at least one of said resistors being connected in parallel with input elements of said holding transistor.

3. The capacitor discharge pulse source of claim 2 wherein a diode connected between said resistors, input elements of said holding transistor being connected in parallel with one of said resistors to bias said holding transistor on, a stabilizing network including a capacitor, a diode and a resistor connected in parallel with each other and connected in parallel with the diode and said one of said resistors and thereby in parallel with the input elements of said holding transistor, a bypass transistor connected in parallel with said input elements, and a current-sensing resistor connected across the input elements of the bypass transistor and in series with said primary winding.

4. The capacitor discharge pulse source of claim 3 wherein a resistor having a positive temperature coefficient is connected in series between the primary winding and an input element of the bypass transistor.

5. The capacitor discharge pulse source of claim 2 wherein said input circuit means of said holding amplifier switch means includes a capacitor, a diode and a resistor connected in parallel with each other and in parallel with the resistor connected in parallel with the input elements of said holding transistor.

6. The capacitor discharge pulse source of claim 2 wherein said means coupled to the input circuit means includes a repetitive pulse signal generator having an output connected to the input of said charging amplifier switch means and establishing a train of time-spaced triggering pulses to said charging amplifier switch means.

7. The capacitor discharge pulse source of claim 6 wherein said signal generator includes a unijunction pulse signal generator connected in parallel with the primary winding and the charging amplifier switch means and having an output means connected to the input circuit means of said charging amplifier switch means to establish a train of time-spaced triggering pulses to said charging amplifier switch means, a gated discharge switch means connected to discharge said capacitor, and said gated discharge switch means including a gate means, a voltage-sensitive means connected in parallel with said capacitor and said output means and responsive to a selected capacitor voltage, said voltage-sensitive means being connected to fire the gated discharge switch means at a selected voltage level across said voltage sensitive means and thereby discharge the capacitor.

8. A capacitor discharge pulse source for establishing a high voltage pulse from a low voltage direct current source means comprising a capacitor, energy storage transformer means having a primary winding and having an output winding connected to charge said capacitor, a charging amplifier switch means connected in series with said primary winding to direct current source connection means and having an input circuit means controlling conduction through said amplifying switch means, a holding amplifiers switch means connected in series with said input circuit means and said direct current source means, means coupled to the input circuit means to initiate conduction, a resistor means in series with said amplifier switch means and connected to the input of said holding amplifier switch means to control the voltage supplied to said holding amplifier switch means with a regenerative increase in the turn-on of said amplifying switch means into saturation and establishing an increase in the voltage across the charging amplifier switch means and a corresponding degenerative decrease in voltage across the resistor means said holding amplifier switch means includes a holding transistor connected in series with said input circuit means of said charging amplifier switch means and said direct current source means, said holding transistor including input elements and said resistor means includes a plurality of resistors defining a voltage-dividing network connected in series with said charging amplifier switch means and having at least one of said plurality of resistors connected across the input elements of said holding transistor, a bypass transistor connected in parallel with said input elements, the bypass transistor having input elements connected in series with said primary winding and said charging amplifier switch means, and a current-sensing resistor connected across the input elements of the bypass transistor and in series with said primary winding.

9. The capacitor discharge pulse source of claim 8 wherein a resistor having a positive temperature coefficient is connected in series between the primary winding and an input element of the bypass transistor.

10. A capacitor discharge pulse source for establishing a high voltage pulse from a low voltage direct current source means comprising a capacitor, energy storage transformer means having a primary winding and having an output winding connected to charge said capacitor, a charging amplifier switch means connected in series with said primary winding to direct current source connection means and having an input circuit means controlling conduction through said amplifying switch means, a holding amplifier switch means connected in series with said input circuit means and said direct current source means, means coupled to the input circuit means to initiate conduction, a resistor means in series with said amplifier switch means to control the voltage supplied to said holding amplifier switch means with a regenerative increase in the turn-on of said amplifying switch means into saturation and establishing an increase in the voltage across the charging amplifier switch means and a corresponding degenerative decrease in voltage across the resistor means, a gated discharge switch means connected to discharge said capacitor, and said gated discharge switch means including a gate means and a votage-sensitive means connected in parallel with said capacitor and said output means and responsive to a selected capacitor voltage, said voltage-sensitive means being connected to fire the gated discharge switch means at a selected voltage level across said voltage sensitive means and thereby discharging the capacitor.

11. The capacitor discharge pulse source of claim 10 wherein said voltage-sensitive means includes power supply means connected to said gate means, transistor switch means connected to bypass said power supply means from said gate means, a voltage-dividing network connected in parallel with said capacitor to sense the capacitor voltage, and means connecting the voltage-dividing network to the transistor switch means to cut off said transistor switch means and transmit power to said gate means.

12. The capacitor discharge pulse source of claim 11 wherein power supply means includes a coupling capacitor and said transistor switch means includes a cutoff transistor connected to ground and coupling capacitor and having bias means connected to turn on said cutoff transistor and a transistor connecting said voltage-dividing network to said cutoff transistor to turn off said cutoff transistor at a selected capacitor voltage.

* * * * *

UNITED STATES PATENT OFFICE
CERTIFICATE OF CORRECTION

Patent No. 3,651,341　　　　　　　　Dated March 21, 1972

Inventor(s) CHARLES L. SHANO

It is certified that error appears in the above-identified patent and that said Letters Patent are hereby corrected as shown below:

Column 1, Line 17, cancel "to a higher voltage and then rapidly";

Line 18, cancel "discharging of a capacitor";

Column 1, Line 41, cancel "3,372,582" and insert --- 3,372,682 ---;

Column 5, Line 74, cancel "sorted" and insert --- stored ---;

Column 6, Line 44, cancel "58" and insert --- 68 ---;

Column 6, Line 49, cancel ",generally a potential", second occurrence.

Signed and sealed this 7th day of November 1972.

(SEAL)
Attest:

EDWARD M. FLETCHER, JR.
Attesting Officer

ROBERT GOTTSCHALK
Commissioner of Patents